July 9, 1946.　　　H. L. NEWELL　　　2,403,824
CONTROL DEVICE
Filed Dec. 14, 1940　　　2 Sheets-Sheet 1
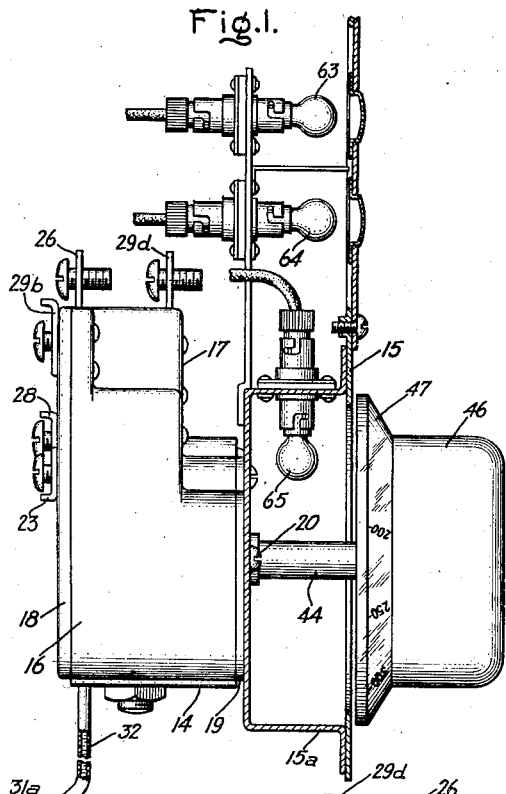
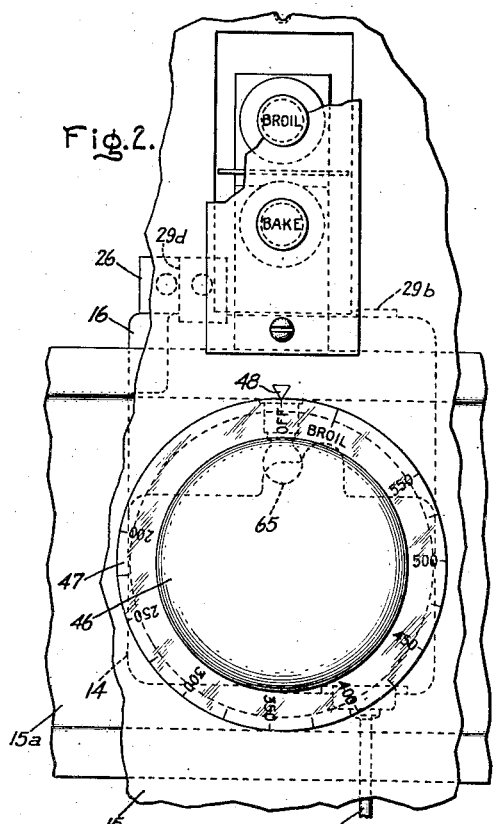
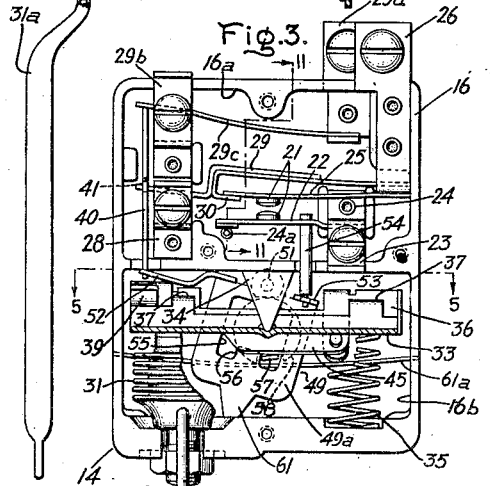
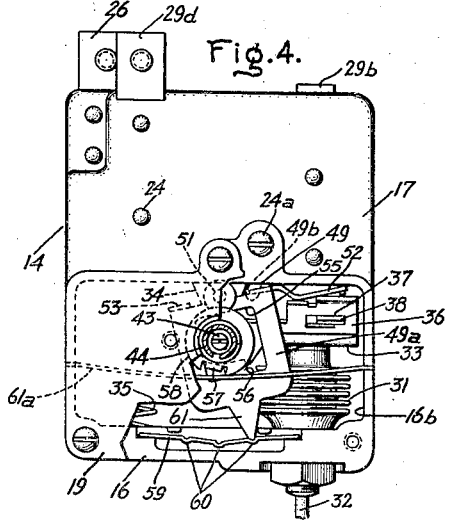
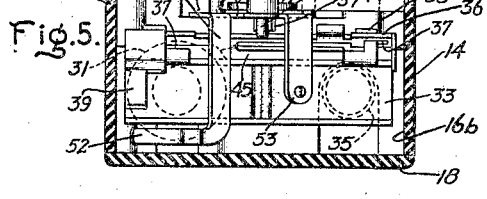
Inventor:
Heber L. Newell,
by Harry E. Dunham
His Attorney.

July 9, 1946.  H. L. NEWELL  2,403,824
CONTROL DEVICE
Filed Dec. 14, 1940   2 Sheets-Sheet 2
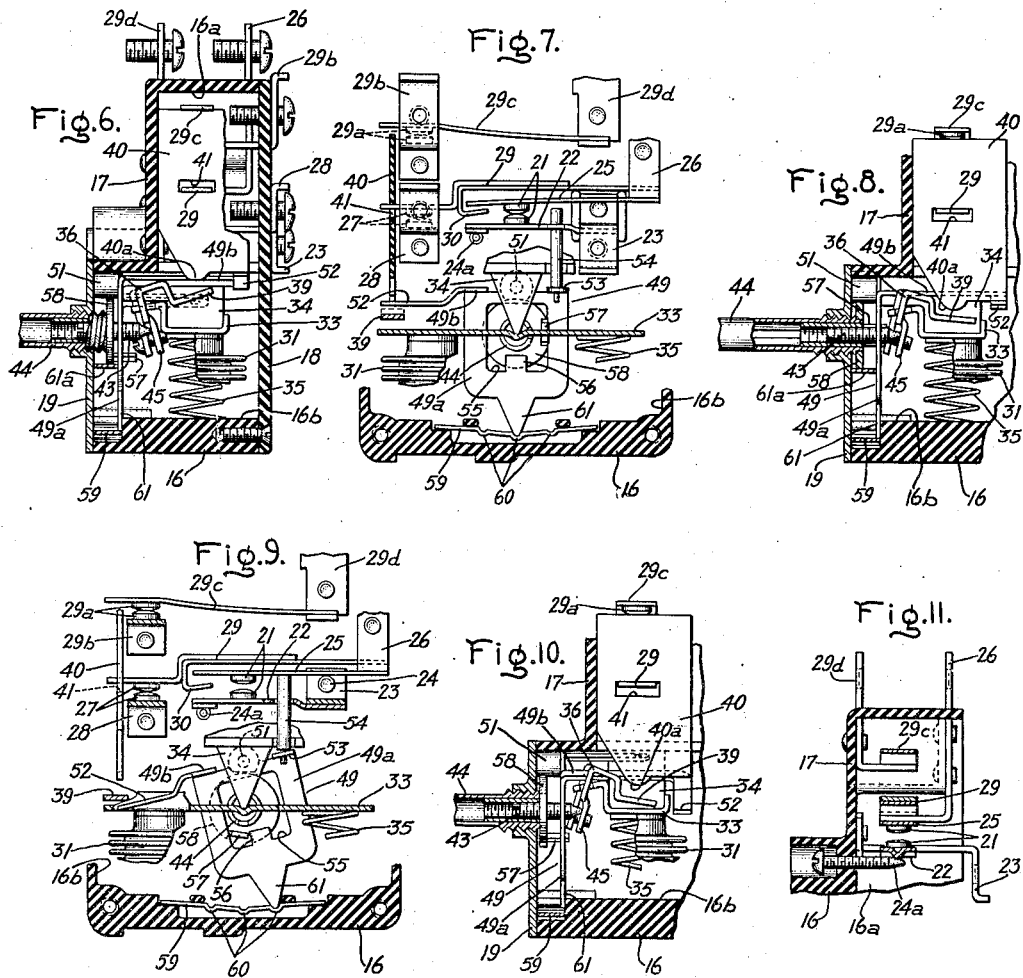
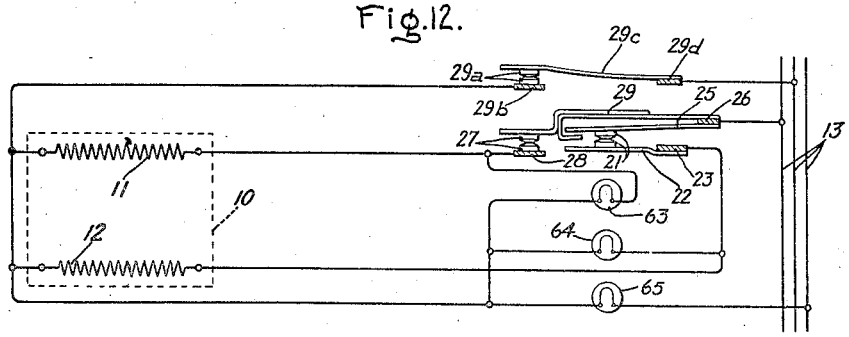
Inventor:
Heber L. Newell,
by Harry E. Dunham
His Attorney.

Patented July 9, 1946

2,403,824

UNITED STATES PATENT OFFICE 2,403,824

CONTROL DEVICE

Heber L. Newell, Bridgeport, Conn., assignor to General Electric Company, a corporation of New York Application December 14, 1940, Serial No. 370,187

6 Claims. (Cl. 219—20)

1

This invention relates to control devices, more particularly to devices for controlling the operation of an oven that is provided with a plurality of heating elements, and it has for its object the provision of an improved control device of this character.

More particularly, this invention relates to a device for controlling an electrically heated oven which is provided with two separate heating elements for applying heat to the oven, one generally used to apply heat for baking operations and the other for generating a broiling heat.

In ovens of this character, both heating elements at times are used to rapidly preheat the oven to the baking temperature, and once this temperature has been attained, the heat generated by the broil element is turned off, the baking temperature being maintained in the main by the bake element.

This invention contemplates the provision of an improved control device which automatically turns off the broil element, and thereafter controls the bake element to maintain the baking temperature. The control device comprises a control element, preferably in the form of a knob, for establishing the baking circuit initially and for adjusting the control device to hold the desired baking temperature. This control knob moreover is arranged to establish a broiling heat and, further, an off condition wherein both the bake and broil heating elements are deenergized.

For a more complete understanding of this invention, reference should be had to the accompanying drawings in which Fig. 1 is a side elevation of a control device embodying this invention shown in its position on a supporting panel of an electric range which is shown in section; Fig. 2 is a front elevation of the control device and panel shown in Fig. 1; Fig. 3 is a rear elevation of the control device of Figs. 1 and 2 with certain parts removed so as to illustrate certain details of construction; Fig. 4 is a front elevation of the control device of Fig. 1 with parts broken away so as to illustrate certain details of construction; Fig. 5 is a sectional view taken through the line 5—5 of Fig. 3 and looking in the direction of the arrows; Fig. 6 is a vertical sectional view taken through a portion of the control device; Fig. 7 is a fragmentary elevation similar to Fig. 3, but illustrating certain of the control elements in different operative positions; Fig. 8 is a fragmentary vertical elevation of a portion of the control device; Fig. 9 is a view similar to Fig. 7, but illustrating certain of the control elements in different operative positions; Fig. 10 is

2 a view similar to Fig. 8, but illustrating certain of the elements in different operative positions; Fig. 11 is a fragmentary sectional view taken through the line 11—11 of Fig. 3 and looking in the direction of the arrows; and Fig. 12 is a diagrammatic representation of an electric oven and a control device therefor arranged in accordance with this invention.

Referring to the drawings, this invention has been shown in one form as applied to an electrically heated oven 10, shown diagrammatically in Fig. 12. The oven 10 is provided with a pair of heating elements 11 and 12, the heating element 11 being a broil element located in the top of the oven and the element 12 being a bake element located in the bottom of the oven. A suitable three-wire source of electrical supply 13 is provided for energizing the heating elements 11 and 12. This supply source comprises two outside wires and a neutral wire between them, the voltage between the outside wires being double that between each outside wire and the neutral. The heating elements 11 and 12 are connected to the supply source through a suitable control device 14, parts of which are shown diagrammatically in Fig. 12, and which is shown in detail in Figs. 1 to 11 inclusive.

The control device 14 is mounted on any suitable part of the electric range. In Figs. 1 and 2 it is illustrated as mounted upon the back splasher 15 of the range, a suitable channel shaped bracket 15a being mounted on the back splasher and supporting the control device 14.

The control device 14 comprises a housing 16 which is formed of any suitable electrical insulating material, such as a suitable phenol condensation product. The housing 16 is provided with two chambers 16a and 16b. The chamber 16a is closed at the front by means of a fixed wall 17 which preferably will be moulded integrally with the remaining parts of the housing 16. The lower chamber 16b is open at the front and back, and a suitable cover 18 is provided for closing the back of this chamber and also the back of the other chamber 16a; this back wall 18 also preferably will be formed of a suitable electrically insulating material, such as a phenol condensation product. The front of the lower compartment 16b is covered by means of a suitable metallic closure member 19, which is used to fasten the device on the bracket 15a. This may be accomplished in any suitable way, as by means of screw fastening devices 20.

Mounted in the compartment 16a are a pair of switch contacts 21 which are arranged to control the energization of the bake element 12. One of these contacts is mounted upon a relatively fixed arm 22 which is mounted upon a terminal 23 rigidly secured to the rear wall 17 of the chamber 16a in any suitable manner, as by rivet 24. While the arm 22 is relatively rigid, it does have some flexibility so that its position can be adjusted. This arm bears against a conical member 24a threaded in the front wall 17 of the chamber 16a and which may be adjusted in or out to vary the position of the contact arm 22. The other contact 21 is mounted on a flexible switch arm 25 which in turn is mounted upon a fixed terminal member 26 which is rigidly secured to the casing 16. Also mounted within the chamber 16a are a pair of contacts 27 which control the energization of the broil element 11. (Figs. 7 and 9.) One of the contacts 27 is mounted upon a fixed terminal member 28, while the other is mounted upon a flexible switch arm 29. The switch arm 29 also is rigidly secured to the terminal member 26. The switch arm 29 is provided with a hook 30 which embraces the movable end of the arm 25 so that when the arm 29 has been lifted sufficiently the hook will engage the arm 25 and separate the contacts 21. In addition, another pair of switch contacts 29a are mounted in the chamber 16a, one on a fixed terminal 29b, and the other on a flexible switch arm 29c. This arm, in turn, is secured to a fixed terminal 29d.

The terminals 23, 26, 28, 29b and 29d of the control device are connected to the supply source and the oven heating elements 11 and 12 in the manner shown diagrammatically in Fig. 12. As here shown, the terminal 23 is electrically connected with one end of the bake element 12; the terminal 28 is connected to one end of the broil element 11, the opposite ends of the two elements 11, 12 being connected with the terminal 29b, and also with one of the outside supply conductors 13, as shown; the terminal 26 is electrically connected with the other outside conductor of the supply source, while the terminal 29d is connected with the neutral wire of the supply source. With the elements thus connected, it will be understood that when the contacts 21 are closed, the bake element 12 will be connected with the outside conductors of the source 13, and when the contacts 27 are closed the broil element 11 will be connected to these conductors, and when these sets of contacts are open and the contacts 29a open the two heating elements will be completely disconnected from the supply source.

The movements of the switch arms are controlled by means of a suitable temperature controlled device 31. This device is mounted within the compartment 16b. The device 31, as shown, is the bellows of a suitable bulb and bellows temperature responsive element. The bellows 31 is connected by means of a capillary tube 32 with a bulb 31a, which is adapted to be placed within the oven 10 so as to respond to its temperature. The bellows 31, the bulb 31a and the tube 32 are all filled with a suitable liquid which expands and contracts as it is heated and cooled so that the bulb is expanded and contracted as the oven heats and cools.

The expansion and contraction of the bellows 31 is used to operate a pivoted lever 33 which is pivoted to move within the chamber 16b. As shown, the lever 33 is pivoted at about its central point on a fixed knife edge bearing 34, which preferably will be formed of the moulded insulating material of which the housing 16 is made and which preferably will be moulded integrally with the housing. As shown, the bellows bears directly against one end of the lever 33, the left-hand end as viewed in Fig. 3, and the motion of the lever by the expansion of the bellows is resisted by a loading compression spring 35 in the chamber 16b and which bears against the other end of the lever, as shown.

The lever 33 is in the form of a shallow channel having short upright flanges at its sides, as shown. The lever carries an elongated bracket 36 on its flange that is positioned adjacent the front closure member 19. The bracket 36 extends substantially parallel to this flange and in its ends are provided with elongated slots 37 which receive hooks 38 projecting outwardly from the upper edge of the flange, as shown, so that the bracket is mounted on the flange for limited pivotal movement on an axis extending lengthwise of the flange.

The bracket at one end, its left-hand end, as viewed in Figs. 5, 6, 8 and 10, carries a tongue 39 which, as shown, extends across the adjacent flange and thence downwardly and laterally across the channel. This tongue is used to transmit the motion of the lever 33 directly to the switch arms 25, 29 and 29c. To transmit this motion, a suitable connection or transmission member 40 is provided. This member is mounted in the chamber 16a for vertical movement, and, as shown, it is provided with a slot 41 which receives the movable end of the switch arm 29; the top edge of the member is arranged to engage the switch arm 29c to operate it at the proper time. The lower end of the member 40 is provided with a downward extension 40a (Fig. 6) which extends downwardly into the chamber 16b for engagement by the tongue 39. When the lever 33 is moved in a clockwise direction, as viewed in Figs. 3, 7 and 9, it elevates the tongue 39 which engages the connection member 40 to elevate it and thereby elevate the switch arm 29. When this arm 29 has been elevated sufficiently it engages the switch arm 25 to elevate it in the manner previously pointed out. Also, the upper edge of the member 40 will engage the switch arm 29c to open the contacts 29a at the proper time, as will be pointed out hereinafter. It is contemplated that when the bellows 31 expands as a result of increasing oven temperature to move the lever 33 in a clockwise direction (as viewed in Fig. 7) the contacts 27 first will be opened to deenergize the broil element 11, and then as the temperature rises the switch arm 29 will engage the switch arm 25 to open the contacts 21 to deenergize the bake element 12. It is further contemplated that subsequently the bellows by its expansion and contraction will control the switch arm 25 to control the bake element 12 to maintain the oven temperature.

The temperature setting of the control device is effected by varying the position of the bracket 36 with reference to the channel 33. This is accomplished by means of a suitable adjusting screw 43 which is threadably mounted in an operating shaft 44. As clearly shown in Figs. 8 and 10, the operating shaft 44 provides for turning it inwardly and outwardly with reference to the closure member 19. The inner end of this screw bears against a flexible tongue 45 which is carried by the bracket 36. It will be observed that when the screw is turned inwardly or outwardly it will vary the position of the bracket 36 with reference to the lever 33, and consequently will vary the position of the tongue 39 on the bracket with reference to the operating member 40. In other words, it will vary the relationship between the bellows 31 and the switch arms so as to set the temperature at which contact arms are moved. It will be clear that if the screw 43 be moved outwardly so that the tongue 39 will drop down into the channel 33, as shown in Fig. 10, the bellows 31 will have to expand to a greater extent before the contact arms are operated, and conversely, if the screw 43 be turned inwardly so as to elevate the tongue 39 with reference to the bottom of the channel, as shown, for example, in Fig. 8, the bellows will have to expand to a lesser extent to operate the contacts. In this way the contacts will be controlled to hold higher and lower oven temperatures. The shaft 44 is provided with a control knob 46 which carries a temperature scale 47 that cooperates with a suitable fixed index 48. The adjusting screw 43 lies on the axis of rotation of the lever 33 so that its adjustment will not effect the motion of the lever.

The control knob 46 is used not only to adjust the temperature setting of the control device, but it is also used to provide an off position for the control device, and also the bake and broil positions. The control knob 46 is connected to the switch arms 25, 29 and 29c by means of a suitable lever 49. The member 49 is mounted for pivotal movement on the bearing member 34. This member is generally of L-shape and, as viewed in the figures, has a vertical section 49a and a horizontal section 49b. The section 49a is pivoted to the bearing 34 by means of a pin 51. The transverse section 49b carries an arm 52 which is arranged to coact with the connection member 40. The member 49 in addition carries another transverse arm 53 on the side of the pivot member 34 opposite to the transverse section 49b which member carries an upright pin 54 which is directed through an aperture provided for it in the switch arm 22 so that it can move up and engage the switch arm 25 under certain conditions of operation.

The vertical section 49a is provided with a rectangular aperture 55 in the bottom of which is an upright tooth 56. Arranged to move within the aperture 55 is an inwardly projecting tooth 57 which is mounted upon a plate 58 which in turn is operated by the shaft 44. Preferably, this plate will be rigidly secured to the shaft 44. When the knob 46 is moved in a counter-clockwise direction to the position indicated "off," shown in Fig. 2, the tooth 57 engages the tooth 56 so as to move the member 49 in a clockwise direction, as viewed in Figs. 3, 4, 7 and 9, to its position shown in Fig. 3. This operation of the member 49 elevates the section 52 carried thereby so that it engages the member 40 to elevate both switch arms 25 and 29 sufficiently far to open both contacts 21 and 27, and the switch arm 29c to open the contacts 29a. This deenergizes both heating elements 11 and 12 and opens the neutral connection. This constitutes the off condition of the control device. When the control knob 46 is moved from the off position in a clockwise direction, as viewed in Fig. 2, it operates the member 49 in a counterclockwise direction, as viewed in Figs. 3, 7 and 9, by the engagement of the tooth 57 with the right-hand edge of the opening 55 so as to move the member 49 from its position of Fig. 3 to its position of Fig. 7. This operation removes the arm 52 from the member 40 to permit its operation by the lever 33. The tooth 57 is then free to move freely within the opening 55 so that it will not effect any further movement of the member 49 until the tooth has been moved completely around and engages the opposite side of the tooth 56, as shown in Fig. 9, whereupon the member 49 is moved from its position of Fig. 7 to its position of Fig. 9. This operation elevates the pin 54 to force the switch arm 25 upwardly to open the contacts 21. In this position of the control device, the bake element 12 will be deenergized, while the broil element 11 will be energized by the contacts 27 which are permitted to remain closed. The motion of the control knob 46 from the point at which the member 49 was moved from its position of Fig. 3 to its position of Fig. 7 to the point at which the tooth 57 again engages the tooth 56 for movement of the member 49 to its position of Fig. 9 is utilized to control the temperature setting of the device, the temperature setting increasing as the control knob is advanced in the clockwise direction from the off position of Fig. 2.

The member 49 is resiliently held in each of its positions of Figs. 3, 7 and 9 by means of a spring 59 provided with three indentations 60 corresponding to the three positions, and adapted to receive and resiliently hold a projection 61 provided on the lower end of the member 49; and knob 46 is resiliently held in its adjusted position by means of a spring 61a which engages the periphery of the disc 58.

In the operation of the control device, it will be understood that when the control knob 46 is in the off position, the switch parts will be as shown in Fig. 3 wherein the contacts 21, 27 and 29a all will be open, these contacts being held in their open position by the pivoted member 49 in the manner previously described. If now it be desired to bake, for example, at a temperature of 450° F., the control knob 46 will be rotated in a clockwise direction, as viewed in Fig. 2, to bring the 450° indication on the scale opposite the pointer 48. This operation will first move the pivoted member 49 from its position of Fig. 3 to its position of Fig. 7. This will drop the tongue 52 away from the member 40 so that all of the contacts are permitted to close; the contacts are shown in this condition in Figs. 7 and 12. When the contacts are thus closed, it will be observed that both the broil and bake elements 11 and 12 will be connected to the supply source 13 so that both will be energized to rapidly heat the oven 10. As the temperature of the oven rises, the bellows 31 will expand and thereby pivot the lever 33 in a clockwise direction, as viewed in Figs. 3, 7 and 9, and as this movement of the lever continues the tongue 39 will engage the operating member 40 to elevate the switch arm 29 and thereby open the switch contacts 27 to deenergize the broil element 11 at some temperature slightly below 450° F. The contacts 21, however, will remain closed so that the heater 12 will continue to function until the oven reaches the desired high temperature of 450° F. at which time the hook 30 of the switch arm 29 will engage the switch arm 25 to break the contacts 21 and thereby deenergize the bake element 12. When the oven temperature falls slightly the bellows will contract sufficiently to permit the switch arm 29 to move towards its closed position until the contacts 21 reclose to reenergize the bake element 12, but the bellows will not contract sufficiently to permit the contacts 27 to reclose. The control device will thereafter function to move the switch arm 29 away from and toward its closed position to open and close the contacts 21 so as to control the energization of the bake element 12 to maintain the oven temperature of 450° F. as long as the position of the control knob is not changed.

The bake element 12 will be controlled in this way to hold the set oven temperature, but if for some reason the oven be abnormally cooled, as by opening the door, or because of a relatively low dip in the supply voltage, or because a relatively cool charge of food be placed in the heated oven, then the bellows 31 will contract sufficiently to permit the switch arm 29 to reclose the contacts 27. This operation will cause the broil heating element 11 to be energized along with the bake heating element 12 to quickly restore the oven temperature back to the desired value, after which the bake element 12 alone will hold the temperature, as before. In other words, the bake switch contacts 21 will control the energization of the bake element 12 to hold the oven temperature, once it has been established, but if the oven temperature falls by a predetermined amount below the desired temperature then the broil element 11 also will be energized to assist the bake element to quickly restore the oven temperature. Also if the control knob be set to a higher temperature than is being maintained by the bake element 12 both heating elements 11 and 12 will bring the oven quickly up to substantially this temperature, as previously described, and thereafter the element 12 alone will be controlled to hold the temperature. If the control knob be set to a lower temperature, the oven will cool down to the desired temperature and the bake element 12 alone will be controlled to hold this temperature.

If the control knob be returned to the off position, the member 49 will be returned to its position of Fig. 3 to open all of the switches, as previously described.

If on the other hand the control knob be advanced completely through its temperature range to its highest temperature setting, the lever 49 will be moved to its position of Fig. 9 which, as previously pointed out, will positively open the bake contacts 21 and will permit the broil contacts 27 to close. This is the broil position, and as long as the knob remains in this position, the broiling element 11 only will be energized. Here, however, the thermostat can function to open the contacts 27 if for any reason the oven temperature should rise to an abnormally high temperature. This might occur if the oven be closed when the broiling unit is energized.

It will be observed that I have provided a control device which will provide an automatic preheat for the oven so that the control knob is moved to the selected baking temperature, the bake and the broil elements will be energized to preheat the oven substantially to this temperature, whereupon the broil element will be deenergized and the bake element only used to hold the temperature. In addition, it will be observed that I have provided a control device which is controlled by a single knob which functions not only to adjust the temperature setting of the device but also functions to provide a positive off condition, and a broil heat.

If desired, suitable indicating lamps may be energized to indicate the bake and broil positions. As shown, a lamp 63 is connected in the broil circuit, and a lamp 64 is connected in the bake circuit so that when either of these circuits is energized its associated lamp will be energized to indicate that the circuit is on. Of course when the oven is being preheated both lamps will be energized.

Still a third lamp 65 located back of the indicating knob may be connected in the circuit so as to be energized whenever the knob is moved from the off position to indicate this condition of the control. The knob preferably will be formed of a transparent or translucent material through which the light may be seen.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A control device for an electric oven provided with first and second heating elements comprising a pair of elongated flexible switch arms controlling said first and second elements respectively, means fixedly supporting corresponding ends of said switch arms, said arms being biased by their resiliency to positions to energize said elements, a thermostat constructed and arranged to operate in accordance with the temperature of said oven, a pivoted lever operated by said thermostat, a driving connection between said lever and the switch arm controlling said second element operating said switch arm to move it away from said energizing position to deenergize said second element when the temperature of said oven attains a predetermined high value, and a driving connection between said switch arms so that said other switch arm is operated away from its energizing position to deenergize said first element at a higher oven temperature and then is controlled to maintain said higher temperature, and means for adjusting the driving connection between said lever and said second element switch arm to adjust the temperature maintained in said oven.

2. A control device for an electric oven provided with first and second heating elements comprising a first switch arm controlling said second element, a second switch arm controlling said first element, a thermostat constructed and arranged to operate in accordance with the temperature of said oven, a lever operated by said thermostat, a bracket pivoted on said lever, driving connections between said bracket and said first switch arm, and between said first switch arm and said second switch arm operating said switch arms so that when the temperature in said oven rises said second element is first deenergized and thereafter said first element is deenergized and its energization subsequently controlled to hold the temperature of said oven, means for pivoting said bracket with reference to said lever to adjust said temperature maintained in said oven, and means operated by said last named means controlling said connection means between said bracket and said first switch arm to prevent the energization of either of said heating elements.

3. A control device for an electric oven provided with first and second heating elements comprising a first switch arm controlling said second element, a second switch arm controlling said first element, a thermostat constructed and arranged to operate in accordance with the temperature of said oven, a lever operated by said thermostat, a bracket pivoted on said lever, driving connections between said bracket and said first switch arm and between said first switch arm and said second switch arm operating said switch arms so that when the temperature in said oven rises said second element is first deenergized and thereafter said first element is deenergized and its energization subsequently controlled to hold the temperature of said oven, a knob connected to said bracket to adjust its position with reference to said lever so as to vary the temperature maintained in said oven, and a member operated by said knob controlling said switch arms to deenergize both of said heating elements, and also to effect the energization of said second element independently of said first element.

4. A control device for an electric oven provided with first and second heating elements comprising a first switch arm controlling said second element, a second switch arm controlling said first element, a thermostat constructed and arranged to operate in accordance with the temperature of said oven, a lever operated by said thermostat, a bracket pivoted on said lever, driving connections between said bracket and said first switch arm and between said first switch arm and said second switch arm operating said switch arms so that when the temperature in said oven rises said first switch arm is operated to deenergize said second element and thereafter said second switch arm is operated to deenergize said first element and to control the energization thereof subsequently to hold the temperature of said oven, a knob connected to said bracket to adjust its position with reference to said lever and with said driving connection so as to vary the temperature maintained in said oven, a pivoted member operably connected with said switch arms constructed and arranged when rotated to a first position in one direction to operate both of said switch arms to deenergize both of said heating elements and when rotated in the opposite direction to a second position to operate said second switch arm to deenergize said first element and said first switch arm to energize said second element only, and when moved to an intermediate position to permit both of said switch arms to energize both of said heating elements, and a lost motion driving connection between said knob and pivoted member constructed and arranged so that said pivoted member is rotated to said first position when said knob is operated to a position to effect a predetermined low temperature adjustment of said bracket, and to said intermediate position when said knob is operated from said position toward its higher temperature adjustment positions where said pivoted member remains until said knob has reached a predetermined high temperature position when said pivoted member is operated to said second position.

5. A control device for an electric oven provided with bake and broil heating elements comprising a pair of elongated flexible switch arms for controlling said elements respectively, means fixedly supporting corresponding ends of said arms and said arms being biased by their resiliency to positions to energize said elements, a manually operable control knob, a driving member, operable connections between said driving member and said switch arms driven by said knob constructed and arranged to move said arms from said positions to deenergize both of said heating elements when said knob is moved to an off position, a thermostat movable in accordance with the temperature of said oven, said knob when moved from said off position permitting said driving member to move into the range of movement of said thermostat so that said switch arms are controlled thereby, and said driving member connected to said switch arms so that upon an increase in temperature of said oven to a predetermined value said broil element switch arm is controlled to deenergize said second element and thereafter said bake element switch arm is controlled to deenergize said bake element and then subsequently controlled to operate said bake element to maintain a predetermined high temperature.

6. In an oven provided with bake and broil heating elements, means for controlling said heating elements comprising a first switch for said bake element and a second switch for said broil element, a control knob, a rocking member connected to said knob so as to be swung between first and second limiting positions when said knob is rotated between off and broil limiting positions, connections between said rocking member and said switches to hold said switches in their off positions to deenergize both said bake and broil heating elements when said knob is in its off position and said rocking member is in said first position, and to operate said second switch to its on position to energize said broil heating element and to hold said first switch in its off position to prevent the energization of said bake element when said knob is in said broil position and said rocking member is in said second position, and said rocking member being operated to an intermediate position when said knob is moved to any one of a plurality of positions between said off and broil positions, said connections thereupon operating said switches to their on positions to energize both of said bake and broil elements, a thermostat responsive to oven temperatures having a moving element movable as the oven temperature varies, and connection means between said movable element and said switches controlled by said knob for operating said second switch to deenergize said broil element when said oven attains approximately a predetermined high temperature and then to control the operation of said first switch to deenergize said bake element when said temperature is attained and thereafter to deenergize and reenergize said bake element to hold said temperature, said temperature depending upon the position of said knob between said off and broil positions.

HEBER L. NEWELL.